(12) United States Patent
Yang

(10) Patent No.: US 11,522,225 B2
(45) Date of Patent: Dec. 6, 2022

(54) HORIZONTAL COMPOSITE ELECTRICITY SUPPLY ELEMENT GROUP

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 395 days.

(21) Appl. No.: 16/535,204

(22) Filed: Aug. 8, 2019

(65) Prior Publication Data
US 2020/0052341 A1  Feb. 13, 2020

(30) Foreign Application Priority Data

Aug. 8, 2018 (TW) ................................. 107127704
Oct. 11, 2018 (TW) ................................. 107135859

(51) Int. Cl.
*H01M 10/0585* (2010.01)
*H01M 10/0525* (2010.01)
(Continued)

(52) U.S. Cl.
CPC ... *H01M 10/0585* (2013.01); *H01M 10/0525* (2013.01); *H01M 10/0565* (2013.01); *H01M 50/183* (2021.01)

(58) Field of Classification Search
None
See application file for complete search history.

(56) References Cited

U.S. PATENT DOCUMENTS 4,777,101 A * 10/1988 Blomberg ............. H01M 10/18
  429/129
5,254,415 A * 10/1993 Williams ............. H01M 50/116
  429/185
(Continued)

FOREIGN PATENT DOCUMENTS

CN  103187370  *  7/2013  ............. H01L 23/28
JP  2007-194090  *  8/2007  ............. H01M 4/02
(Continued)

*Primary Examiner* — Amanda J Barrow
(74) *Attorney, Agent, or Firm* — Rabin & Berdo, P.C.

(57) ABSTRACT

A horizontal composite electricity supply element group comprises a first insulation layer, a second insulation layer, a first patterned conductive layer, a second patterned conductive layer, and a plurality of electricity supply element groups. The first patterned conductive layer is disposed on the first insulation layer. The second patterned conductive layer is disposed on the second insulation layer. The plurality of electricity supply element groups are disposed between the first insulation layer and the second insulation layer, and connected in series and/or in parallel via the first patterned conductive layer and the second patterned conductive layer. The electricity supply element group is formed by several serially connected independent electricity supply elements whose electrolyte systems do not circulate with one another. Thereby, the high voltage produced by connection will not influence any single electricity supply element nor decompose their respective electrolyte systems.

12 Claims, 17 Drawing Sheets

(51) Int. Cl.
  *H01M 10/0565* (2010.01)
  *H01M 50/183* (2021.01)

(56) References Cited

U.S. PATENT DOCUMENTS

| | | | | |
|---|---|---|---|---|
| 5,264,305 | A * | 11/1993 | Charkey | H01M 10/282 429/152 |
| 6,074,774 | A * | 6/2000 | Semmens | H01M 10/0468 429/94 |
| 2010/0227208 | A1* | 9/2010 | Kim | H01G 9/02 429/94 |
| 2011/0300433 | A1* | 12/2011 | Kim | H01M 50/502 429/159 |
| 2012/0021268 | A1* | 1/2012 | Mailley | H01M 50/543 429/94 |
| 2016/0049646 | A1* | 2/2016 | Fujiki | H01M 4/366 429/231.95 |
| 2016/0190642 | A1* | 6/2016 | Fukunaga | H02J 7/007194 320/107 |
| 2016/0315346 | A1* | 10/2016 | Sasaki | H01M 4/667 |
| 2017/0040582 | A1* | 2/2017 | Kim | H01M 50/116 |
| 2018/0053926 | A1* | 2/2018 | Shaffer, II | H01M 10/18 |
| 2018/0151910 | A1* | 5/2018 | Zimmerman | H01M 8/0202 |
| 2018/0366770 | A1* | 12/2018 | Solan | H01M 10/0585 |
| 2019/0027732 | A1* | 1/2019 | Tsutsumi | H01M 10/613 |
| 2019/0074552 | A1* | 3/2019 | Matsumoto | H01M 50/531 |
| 2019/0237717 | A1* | 8/2019 | Boufnichel | H01M 10/46 |
| 2020/0052000 | A1* | 2/2020 | Yang | H01M 10/0463 |
| 2020/0227789 | A1* | 7/2020 | Minamida | H01M 10/0585 |

FOREIGN PATENT DOCUMENTS

| | | | | |
|---|---|---|---|---|
| WO | WO 01/80338 | * | 10/2001 | H01M 10/0436 |
| WO | WO 2012/038887 | * | 3/2012 | H01M 10/02 |

* cited by examiner

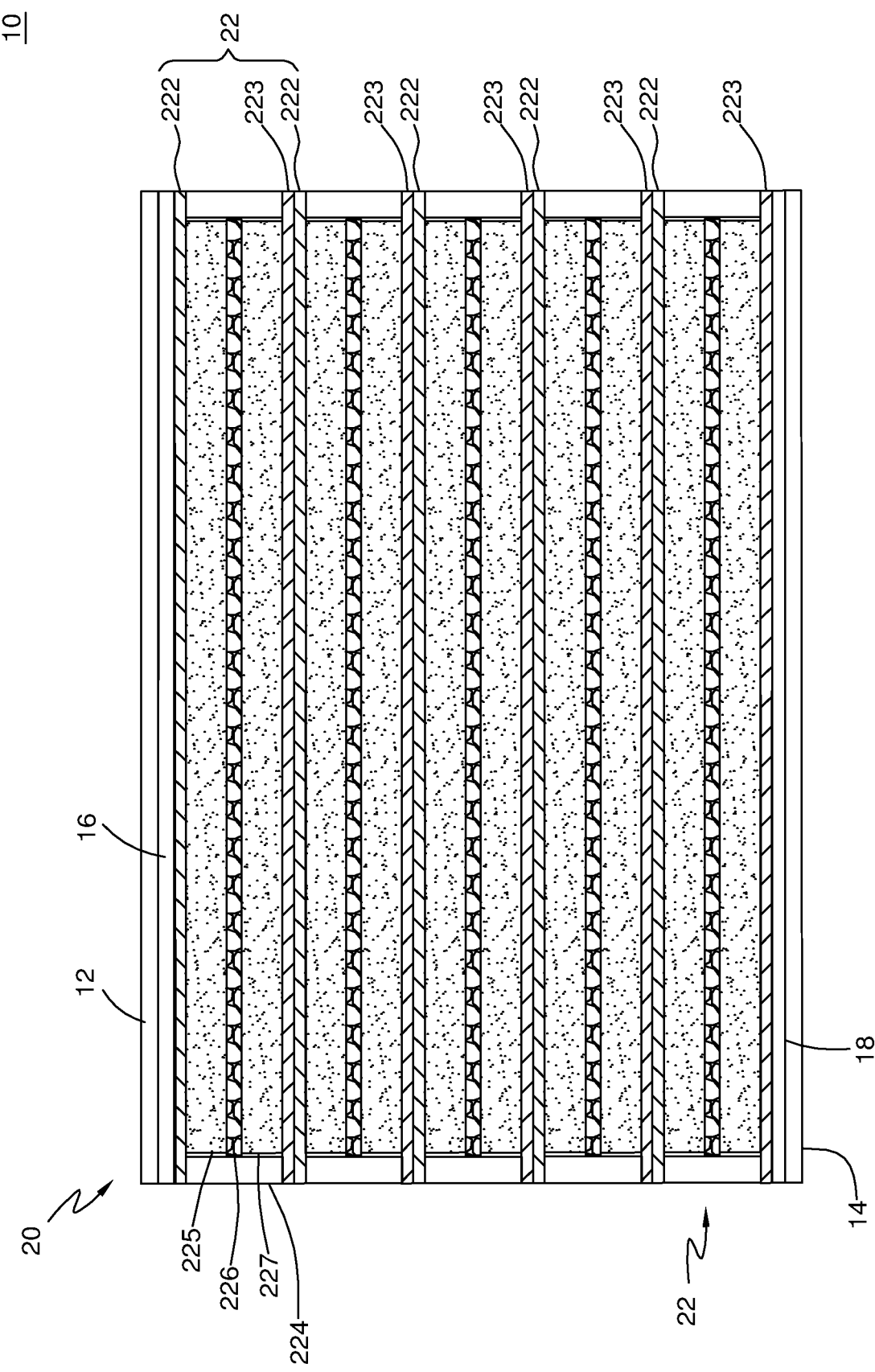

HORIZONTAL COMPOSITE ELECTRICITY SUPPLY ELEMENT GROUP

FIELD OF THE INVENTION

The present invention relates generally to an electricity supply element group, and more particularly to a high-voltage and high-capacity horizontal composite electricity supply element group.

BACKGROUND OF THE INVENTION

In recent years, due to the exhaustion of petrochemical fuels and the prevalence of the consciousness of environmental protection, people are forced to rethink how to balance between convenient life and environmental protection for those objects using petrochemical fuels as the power source and exhausting massive greenhouse gases. Cars, as important transportation vehicles, become one of the primary objects to be inspected. Accordingly, under the global trend of energy saving and carbon reduction, many countries worldwide set the vehicle electrification as an important target for the carbon dioxide reduction. Unfortunately, electric vehicles face many problems in practical applications. For example, the driving range of the electric vehicle is determined by the capacity of electricity supply elements, such as batteries. Therefore, more batteries should be connected in series or in parallel to increase the capacity for extending the mileage of the electric vehicle.

To extend mileage with lower weight, secondary batteries with high energy density and light weight, such as lithium-ion secondary batteries, have become the best choice for the batteries of the electric vehicles. Nonetheless, how to assemble multiple lithium-ion secondary batteries to form a safe and stable power source has become an urgent challenge for people.

First, please refer to FIG. 1A and FIG. 1B, showing the common method. After multiple sets of the battery elements 71 are connected in parallel, the housing 72 is used for sealing and forming the battery cell 73. Then the conductive leads 74 protruding from the housings 72 of the battery cells 73 are connected in series externally to reach a sufficient voltage of the battery module 75 for the electric vehicles. According to another method, a single housing 72 is adopted for covering multiple battery elements 71, as shown in FIG. 2A and FIG. 2B. In other words, internal series connection is adopted for increasing the voltage of the battery cell 76. Then multiple battery cells 76 are externally connected in parallel to reach sufficient capacity for the electric vehicles. Unfortunately, current electrolyte can only sustain around 5 volts. Besides, it is difficult to form a closed system for the electrolyte due to internal structural problems. Once the voltage exceeds the sustainable range of the electrolyte, the electrolyte will decompose and make the battery module 77 fail. Even worse, the battery might explode. Accordingly, there is no such product in the market.

According to the US patent application No. 2004/0091771, adjacent battery modules share a common electricity collecting layer. By using this method, the problem of electrolyte decomposition as described above can be solved. Unfortunately, owing to the series connection to the common current collecting layer, the design will be less flexible. Only internal series connection can be adopted. To form a battery module, external parallel connection of a plurality of battery cells still should be adopted.

Furthermore, according to a composite battery cell of Taiwan patent application No. 106136071, the series and parallel connections are made inside the battery cells directly to achieve higher voltage and bigger specific capacity. The drawbacks of lower performance and reduced capacity density due to external connection according to the conventional battery structure is eliminated. Unfortunately, according to the application, a great number of electricity supply elements have to be vertically stacked for series and/or parallel connections to achieve high capacity and high voltage.

Nonetheless, while facing puncture of a metal object, the high voltage drop caused by puncture is unavoidable and extremely dangerous for fully solid, pseudo solid (solid/liquid), or liquid electrolyte systems. It is particularly dangerous for electricity supply element group formed by vertically stacking massive electricity supply elements internally by series connections.

To eliminate the drawbacks, the present invention provides a novel horizontal composite electricity supply element group for avoiding safety concerns caused by puncture of the battery elements resulting from the metal objects.

SUMMARY

An objective of the present invention is to provide a horizontal composite electricity supply element group, which adopts horizontal series and/or parallel connections to connect electrically multiple electricity supply element groups for reducing the number of vertically stacked electricity supply elements and avoiding safety problems resulting from puncture of the battery elements by metal objects.

Another objective of the present invention is to provide a horizontal composite electricity supply element group. A first insulation layer and a second insulation layer are disposed at the top and bottom, respectively. Multiple electricity supply element groups extending horizontally and connected in series and/or in parallel are disposed between the first and second insulation layers. By using the first and second insulation layers, the potential damages caused by punctures on the electricity supply elements by external metal objects can be avoided.

Another objective of the present invention is to provide a horizontal composite electricity supply element group. No electrochemical reaction occurs between adjacent electricity supply elements except for the charge transfer. Thereby, the capacity density and voltage are improved by series and/or parallel connections without being limited by the maximum voltage of allowance of the electrolyte.

Still another objective of the present invention is to provide a horizontal composite electricity supply element group. Multiple channels are formed between the adjacent electricity supply element groups to act as paths for heat dissipation.

A further objective of the present invention is to provide a horizontal composite electricity supply element group. The current collecting layers between the electricity supply elements are contacted directly. The contact area is much larger than the one by soldering according to the conventional art. Thereby, the internal resistance of the electricity supply element group can be reduced substantially. There is little loss in the performance of the power module formed by the electricity supply element groups. In addition, because of the reduction of resistance, the charging and discharging speed are increased significantly, and the heating problem is reduced significantly. Then the cooling system of the power module can be simplified, and it is easier to manage and control the cooling system. Thereby, the reliability and safety of the overall composite electricity supply element group are enhanced.

To achieve the above objectives, the present disclosure provides a horizontal composite electricity supply element group, which comprises a first insulation layer, a second insulation layer, a first patterned conductive layer, a second patterned conductive layer, and a plurality of electricity supply element groups. The second insulation layer is disposed opposed to the first insulation layer. The first patterned conductive layer is disposed on a first surface of the first insulation layer. The second patterned conductive layer is disposed on a second surface of the second insulation layer. The first patterned conductive layer is opposed to the second patterned conductive layer. The plurality of electricity supply element groups are disposed between the first insulation layer and the second insulation layer, and connected in series and/or in parallel via the first patterned conductive layer and the second patterned conductive layer. Each electricity supply element comprises an isolation layer, two active material layers, two current collecting layers, an electrolyte system, and a package layer. The two active material layers are disposed on both sides of the isolation layer, respectively. The two current collecting layers are disposed on the outer sides of the active material layers, respectively. The electrolyte system is disposed in the active material layers. The package layer is disposed on the periphery of the two current collecting layers for gluing the current collecting layers and encapsulating the electrolyte system between the two current collecting layers. In other words, each electricity supply element is an independent module. The electrolyte systems do not circulate with one another. No electrochemical reaction occurs between the adjacent electricity supply elements except for charge transfer. Thereby, the electricity supply elements can connect in series and/or parallel without being limited by the maximum permissible voltage of the electrolyte system.

In the following, concrete embodiments are described in detail for understanding the objective, technologies, feature, and the effects provided by the present disclosure.

BRIEF DESCRIPTION OF THE DRAWINGS

FIG. 5B shows a partially enlarged diagram of the region A in FIG. 5A;

DETAILED DESCRIPTION

Given the safety problem caused by puncture by sharp metal objects of multiple electricity supply elements stacked vertically and connected in series/parallel to meet the demand for high voltage and high capacity, the present disclosure provides a novel horizontal composite electricity supply element group to solve the puncture problem. The above composite electricity supply element group can be any supply element capable of storing energy and supply external devices, such as batteries or capacitors.

The present disclosure mainly discloses a horizontal composite electricity supply element group, which comprises a plurality of electricity supply element groups. The electricity supply element group comprises one or more electricity supply elements vertically stacked and connected in serial and/or in parallel. Then, after the electricity supply element groups are connected in series or in parallel in the horizontal direction via the first and second patterned conductive layers, a first terminal and a second terminal are connected to the electricity supply element groups to form the composite electricity supply element group. In other words, inside the composite electricity supply element group, both series and parallel connections can be made. The electricity supply elements of the electricity supply element group according to the present disclosure are independent and complete electricity supply modules. The electrolyte systems of the electricity supply elements do not circulate with one another. The drawings described are only schematic and are non-limiting. The lithium battery is adopted in the following embodiments for description. A person having ordinary skill in the art knows well that the embodiment does not limit the scope of the present disclosure.

Figure 1B:
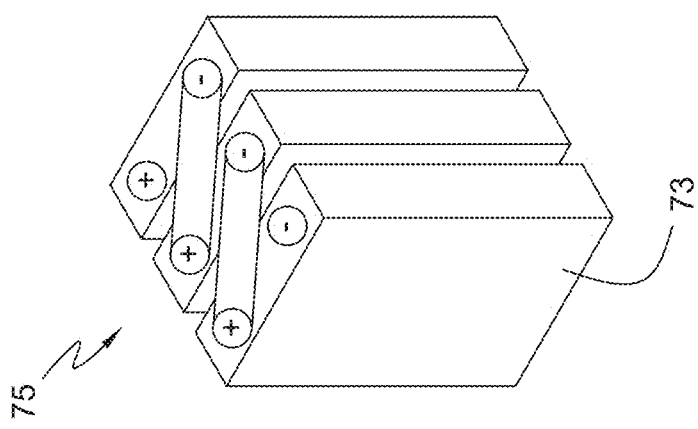
FIGS. 1A and 1B show schematic diagrams of the battery cell and battery module according to the first embodiment according to the prior art.
Figure 1A:
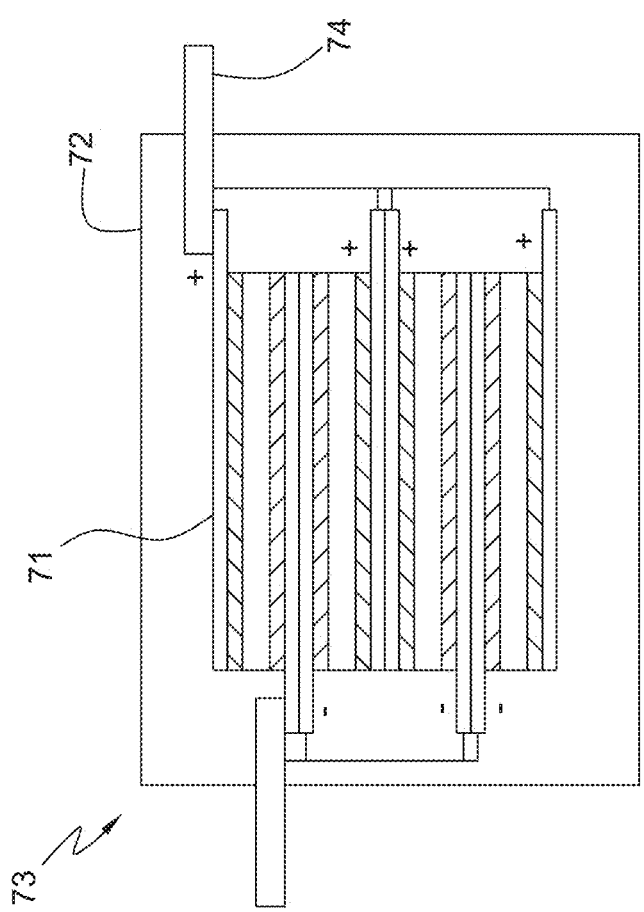
Figure 2B:
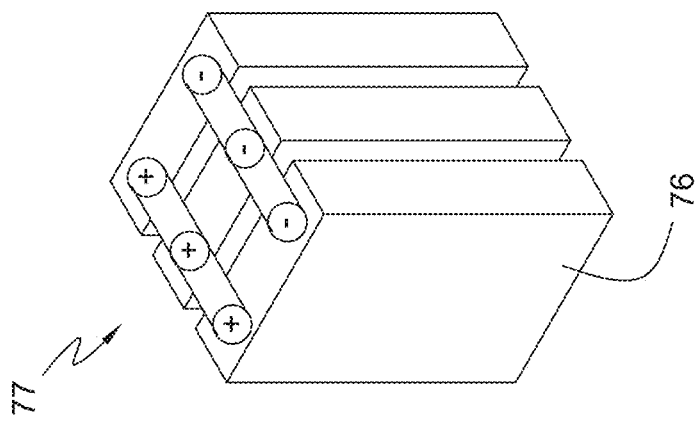
FIGS. 2A and 2B show schematic diagrams of the battery cell and battery module according to the second embodiment according to the prior art.
Figure 2A:
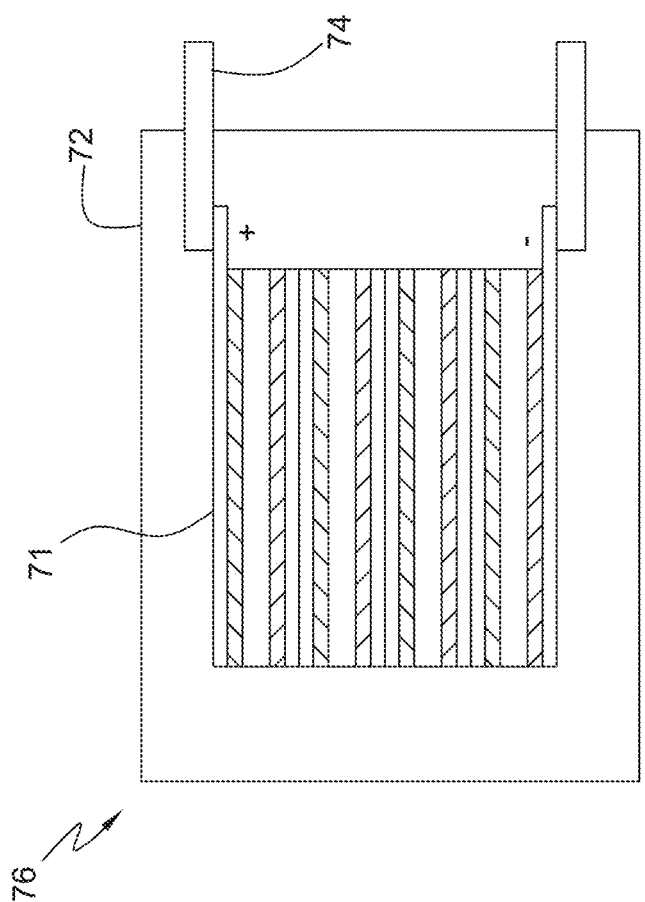
Figure 3:
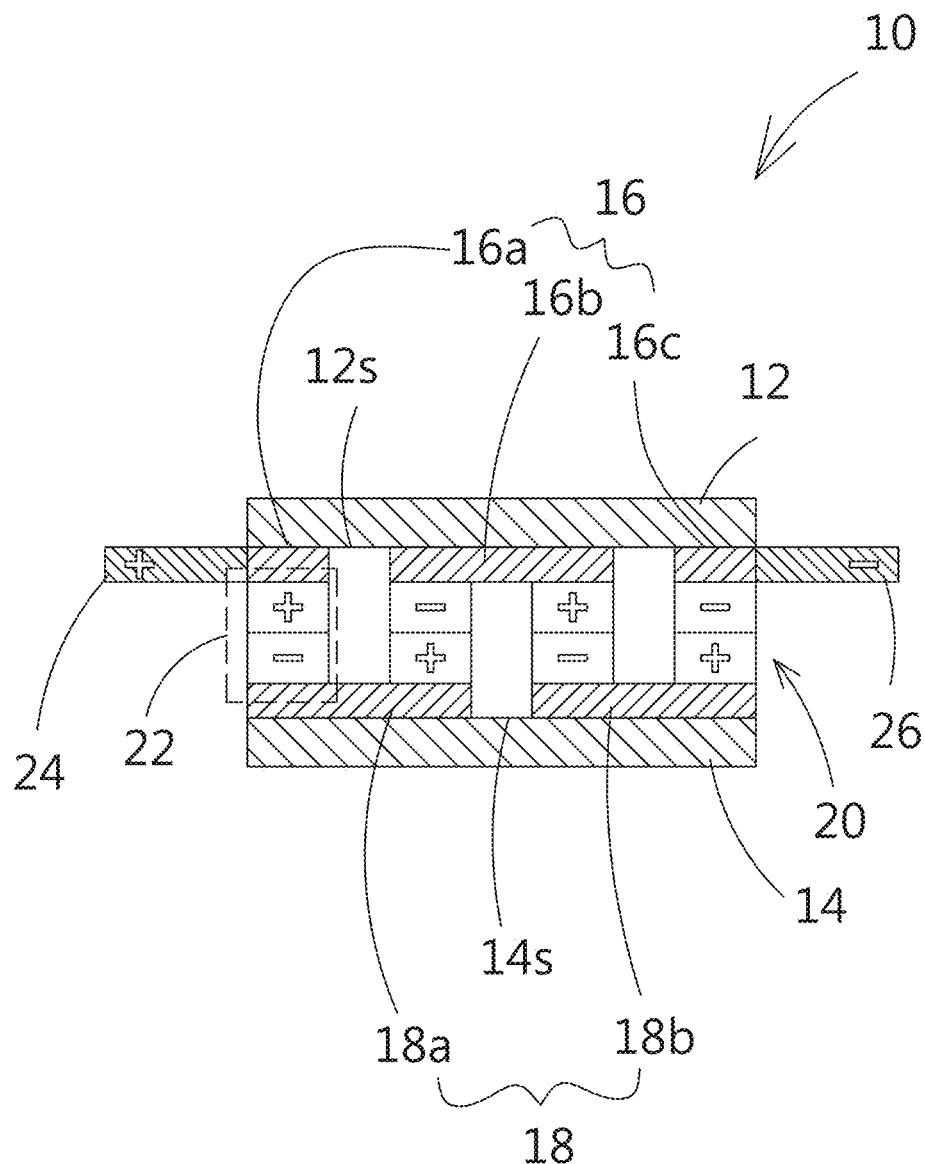
FIG. 3 shows a schematic diagram of the horizontal composite electricity supply element group according to the first embodiment of the present disclosure.

First, please refer to FIG. 3, which shows a schematic diagram of the horizontal composite electricity supply element group according to the first embodiment of the present disclosure. As shown in the figure, the horizontal composite electricity supply element group 10 according to the present disclosure mainly comprises a first insulation layer 12, a second insulation layer 14, a first patterned conductive layer 16 (16*a*, 16*b*, 16*c*), a second patterned conductive layer 18 (18*a*, 18*b*), and a plurality of electricity supply element groups 20. The second insulation layer 14 is opposed to the first insulation layer 12 in the horizontal direction. The first patterned conductive layer 16 is located on a first surface 12*s* extending horizontally inside the first insulation layer 12. The second patterned conductive layer 18 is located on a second surface 14*s* extending horizontally inside the second insulation layer 14. The first patterned conductive layer 16 is opposed to the second patterned conductive layer 18. The material of the first and second patterned conductive layers 16, 18 can be selected from the group consisting of metals and any conductive materials. The plurality of electricity supply element groups 20 are arranged side by side and sandwiched between the first and second insulation layers 12, 14 and connected electrically to the different polarity via the first and second patterned conductive layers 16, 18 for forming series connection. The words "side by side" mean that the plurality of electricity supply element groups 20 are not stacked vertically along a single Z axis. Instead, they are disposed in the horizontal direction.

Figure 4A:
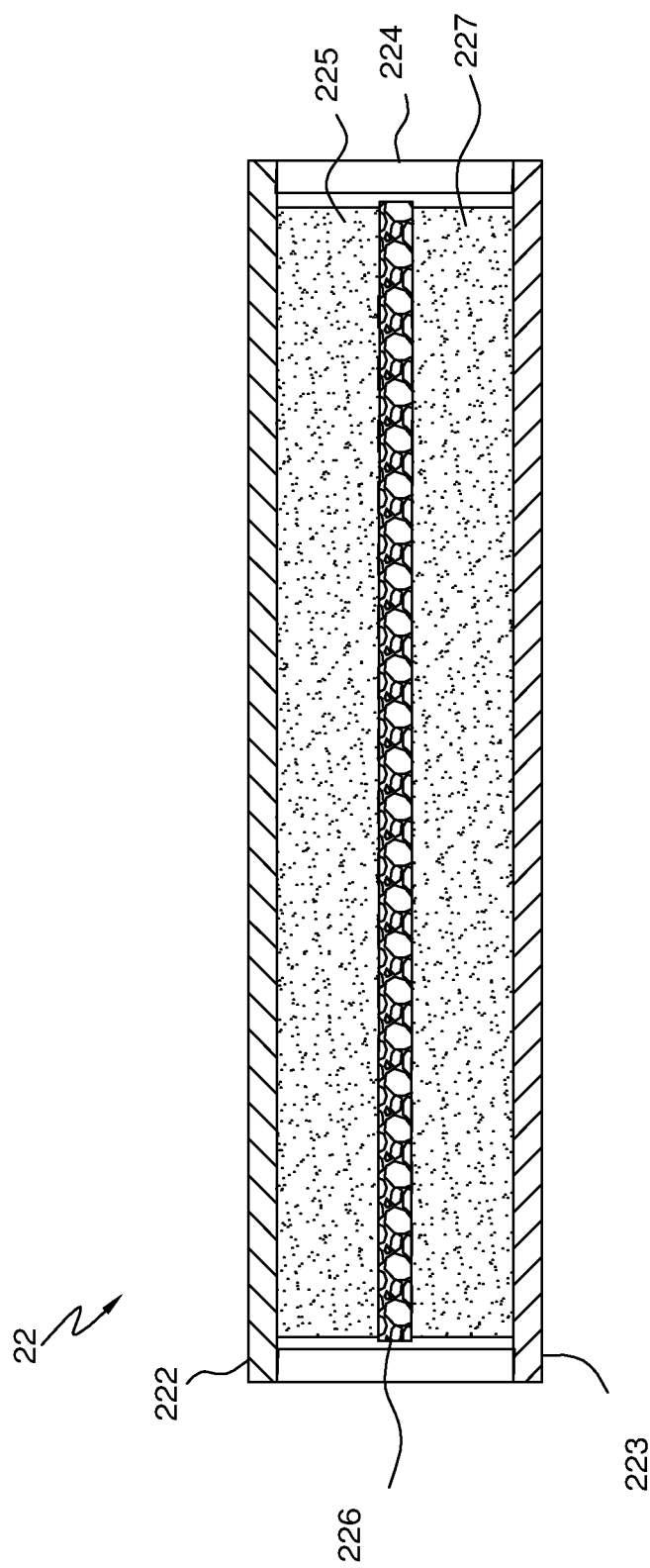
FIG. 4A shows a structural schematic diagram of the electricity supply element according to the present disclosure.

The electricity supply element group 20 as described above is formed by one or more electricity supply elements 22. For example, in FIG. 3, the horizontal composite electricity supply element group 10 is formed by four electricity supply element groups 20 connected in series. Each of the electricity supply element groups 20 is formed by a single electricity supply element 22. The structure of the above electricity supply element 22 is shown in FIG. 4A. The electricity supply element 22 includes a first current collecting layer 222, a second current collecting layer 223, a package layer 224, a first active material layer 225, an isolation layer 226, and a second active material layer 227. The package layer 224 is sandwiched between the first and second current collecting layers 222, 223. The first current collecting layer 222, the second current collecting layer 223, and the package layer 224 form a sealed space to block external moisture and oxygen. The first active material layer 225, the isolation layer 226, and the second active material layer 227 are deposited sequentially in the sealed space. The electrolyte system is disposed in the first active material layer 225 and the second active material layer 227. The first active material layer 225 is connected to the first current collecting layer 222, and the second active material layer 227 is connected to the second current collecting layer 223. The materials of the isolation layer 226 include polymer materials, ceramic materials, and glass fiber materials. Also, the isolation layer 226 has the micro holes to permit ion migration. The micro holes are formed by through holes, nonlinear holes, or even made by porous materials. In addition, porous ceramic insulative materials can be distributed inside the micro hole of the substrate. The ceramic insulative materials can be formed by materials such as micrometer- or nanometer-scale titanium dioxide ($TiO_2$), aluminum oxide ($Al_2O_3$), silicon dioxide ($SiO_2$), or alkylated ceramic particles. The ceramic insulative material can further include polymer adhesives, such as polyvinylidene fluoride (PVDF), polyvinylidene fluoride-co-hexafluoropropylene (PVDF-HFP), polytetrafluoroethylene (PTFE), acrylic acid glue, epoxy, polyethylene oxide (PEO), polyacrylonitrile (PAN), or polyimide (PI).

The electrolyte system is disposed in the first and second active material layers 225, 227. The form of the electrolyte system is selected from the group consisting of liquid state, pseudo solid state, gel state, solid state or combinations thereof. The active materials of the active material layers 225, 227 can convert the chemical energy to the electrical energy for usage (supplying electricity) or electrical energy to chemical energy for storage (charging), and can achieve ion conduction and transport concurrently. The generated electrons can be led outward via the first and second current collecting layers 222, 223. The common materials for the first and second current collecting layers 222, 223 include copper and aluminum. Alternatively, they can include other metals such as nickel, tin, silver and gold, metal alloys or stainless steel.

The material of the package layer 224 includes epoxy, polyethylene, polypropylene, polyurethane, thermoplastic polyimide, silicone, acrylic resin, or ultraviolet-hardened glue. The material is disposed on the periphery of the two current collecting layers 222, 223 for gluing them and sealing the electrolyte system therebetween for avoiding leakage and circulation with the electrolyte system of another electricity supply element 22. Thereby, each electricity supply element 22 is an independent and complete electricity supply module.

To improve the sealing effect of the package layer 224, the package layer 224 can be designed to have three layers. Please refer to FIG. 4B. The top and bottom layers are two modified silicone layers 224*a*, 224*c* and the middle layer is a silicone layer 224*b*. The modified silicone layers 224*a*, 224*c* on both sides are modified by adjusting the ratio of addition and condensation silicone for gluing different materials. By using the design, the adhesion at the interface is increased. At the same time, the overall appearance is more complete, and the production yield is improved. Furthermore, the design can block permeation of moisture from outside. Internally, the silicone layer 224*b* acts as the main structure to block damages caused by the polar solvent and the plastic agent from inside. Thereby, the overall sealing structure can be more complete.

Figure 4B:
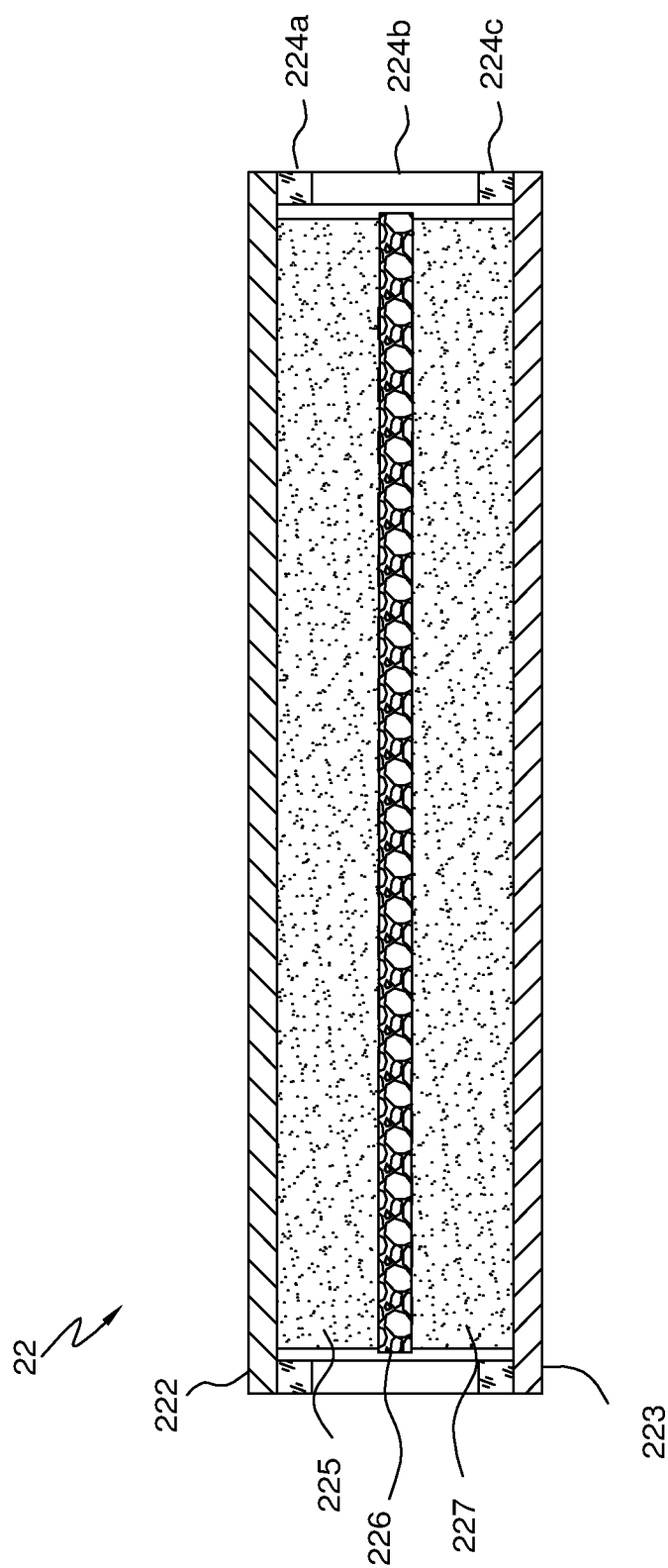
FIG. 4B shows another structural schematic diagram of the electricity supply element according to the present disclosure.

In addition, for easier description and identification, the electricity supply elements 22 in the figures for illustrating the horizontal composite electricity supply element group use simple positive and negative symbols to identify the positive and negative electrical polarities, instead of plotting the detailed components of the electricity supply element 22 as shown in FIG. 4A and FIG. 4B. A person having ordinary skill in the art should know the meanings of the positive and negative polarities. Hence, the details will not be described again.

Figure 5A:
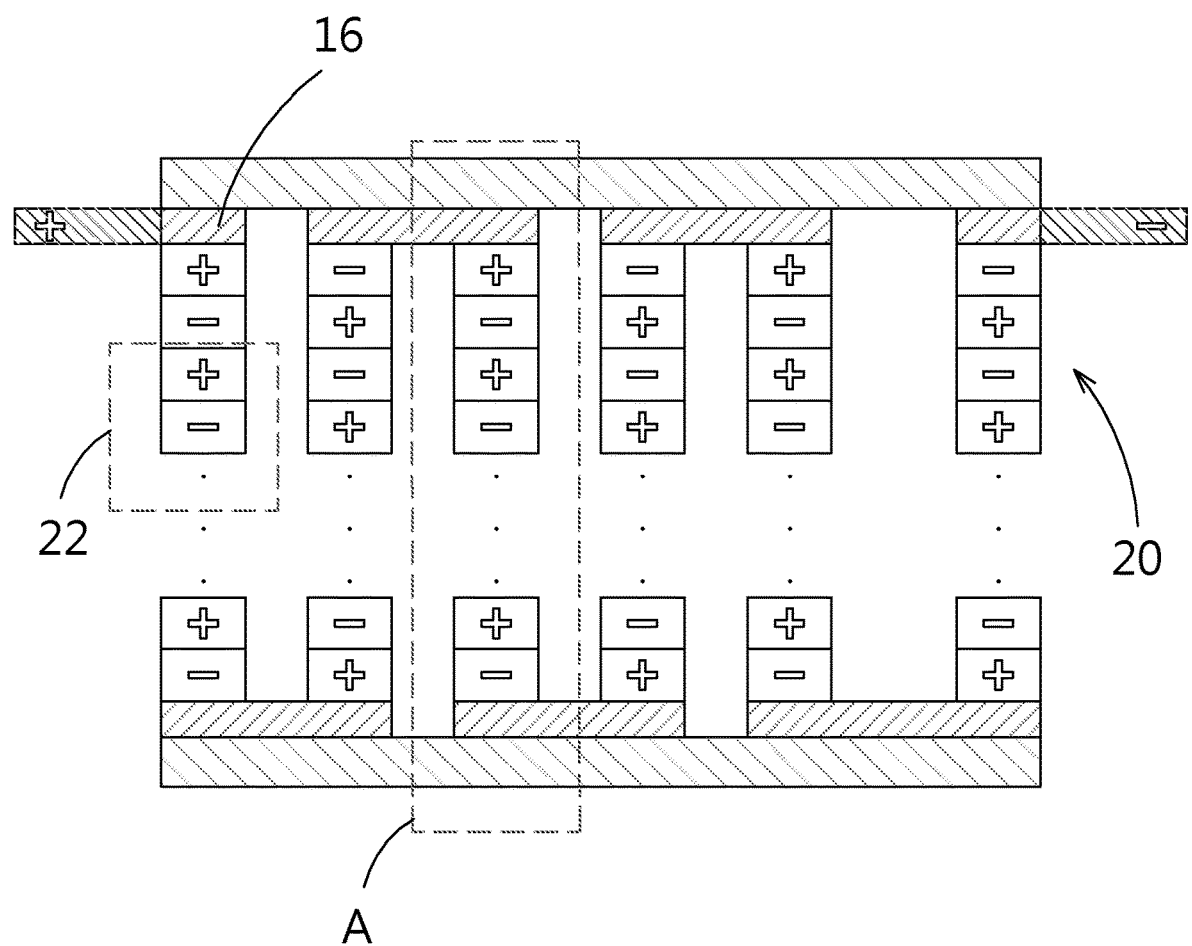
FIG. 5A shows a schematic diagram of the embodiment of FIG. 3 in which the electricity supply element group of the horizontal composite electricity supply element group is formed by serially connecting multiple electricity supply elements.

As shown in FIG. 5A and FIG. 5B, the electricity supply element group 20 is formed by a plurality of electricity supply elements 22 connected in series. The outermost sides of the electricity supply elements 22 are the first and second current collecting layers 222, 223. Hence, the first and second current collecting layers 222, 223 of the adjacent electricity supply elements 22 are connected with each other by directly contacting to form an electrical series connection. For example, as shown in the figures, the polarity of the first current collecting layer 222 is positive, and the polarity of the second current collecting layer 223 is negative. The second current collecting layer 223 of the topmost electricity supply element 22 contacts the first current collecting layer 222 of the next (below) electricity supply element 22. The second current collecting layer 223 of this electricity supply element 22 contacts the first current collecting layer 222 of the further next electricity supply element 22. By stacking sequentially, the electricity supply element group 20 in series connection is formed. Because each electricity supply element 22 is an independent electricity supply module, their electrolyte systems do not circulate with one another. Thereby, no electrochemical reactions occur between the adjacent electricity supply elements 22 except for charge transfer (that is to say, ions will not transfer or conduct). Therefore, even if multiple electricity supply elements 22 are connected in series to form a high voltage, the electrolyte system of each individual electricity supply element 22 will not be influenced. The internal voltage is still maintained at the voltage of a single electricity supply element 22. Thereby, the electricity supply element group 20 with high voltage can be formed by stacking multiple electricity supply elements 22 in series without being limited by the maximum voltage (generally, around 5 volts) of the electrolyte system.

The top surface electrode (the first current collecting layer 222) of the topmost electricity supply element 22 in the electricity supply element group 20 contacts directly with the first patterned conductive layer 16 to form electrical connection. The bottom surface electrode (the second current collecting layer 223) of the bottommost electricity supply element 22 in the electricity supply element group 20 contacts the second patterned conductive layer 18 to form electrical connection. The method of the direct contact as described above can be made via physical contact or chemical contact. More specifically, the direct contact can be formed by soldering with or without soldering material or by melting method. Alternatively, conductive silver glue or conductive cloth can also be adopted.

Figure 6:
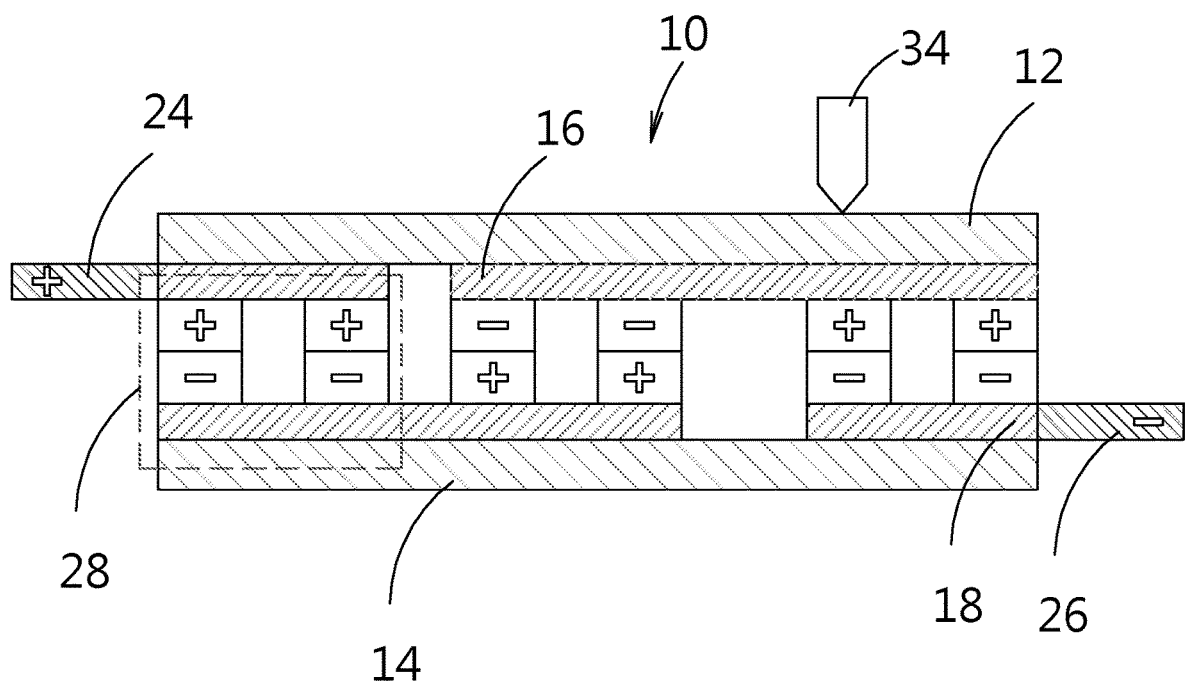
FIG. 6 shows a schematic diagram of electricity supply element groups of the horizontal composite electricity supply element group connected internally and in parallel according to an embodiment of the present disclosure.

The horizontal composite electricity supply element group 10 according to the present disclosure further comprises a first conductive lead 24 and a second conductive lead 26. In FIG. 3, both the first conductive lead 24 and the second conductive lead 26 are connected electrically to the first patterned conductive layer 16, or to the second patterned conductive layer 18. Alternatively, they can be connected to different patterned conductive layers 16, 18. For example, the first conductive lead 24 is connected electrically to the first patterned conductive layer 16 while the second conductive lead 26 is connected electrically to the second patterned conductive layer 18, as illustrated in FIG. 6.

Furthermore, the first conductive lead 24 and the second conductive lead 26 can be formed integrally with the first patterned conductive layer 16 or the second patterned conductive layer 26, which are connected electrically with them. In other words, during the process of patterning of the first patterned conductive layer 16 or the second patterned conductive layer 26, the patterns for connecting with the first conductive lead 24 and the second conductive lead 26 are reserved. When the first and second conductive leads 24, 26 are not formed integrally with the patterned conductive layers 16, 18, the materials of the first and second conductive leads 24, 26 may be different from those of the first and/or second patterned conductive layers 16, 18. In addition, the first and second conductive leads 24, 26 can be formed by soldering with or without soldering material, or by a melting method. Alternatively, conductive silver glue or conductive cloth can be adopted.

Figure 7:
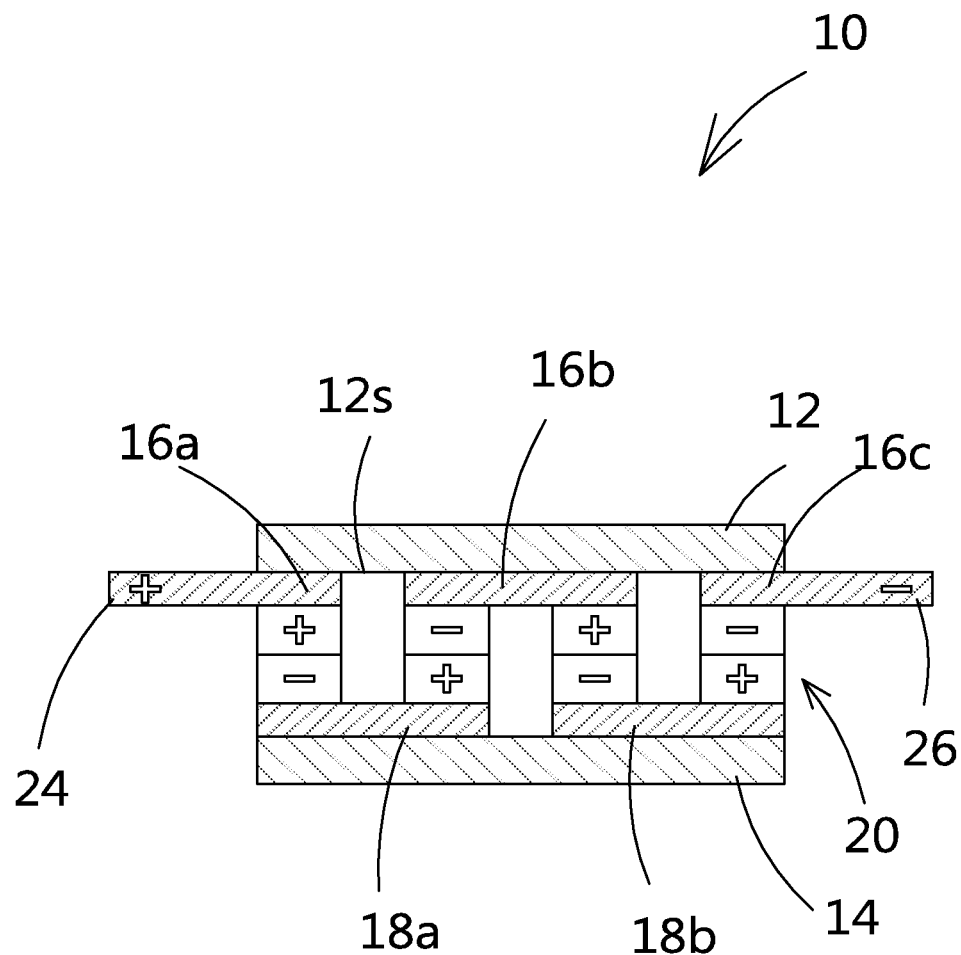
FIG. 7 shows a schematic diagram of the horizontal composite electricity supply element group according to another embodiment of the present disclosure.

Please refer to FIG. 7. In the figure, a portion of the first patterned conductive layer 16a is extended to the outside of the first insulation layer 12 to act as the first conductive lead 24, and a portion of the first patterned conductive layer 16c is extended to the outside of the first insulation layer 12 to act as the second conductive lead 26. And, in the figure, multiple electricity supply element groups 20 (in the figure, one electricity supply element group 20 is formed by a single electricity supply element 22) are all connected together in opposite polarity via the first and second patterned conductive layers 16, 18 to make the multiple electricity supply element groups 20 be connected in series.

Figure 8A:
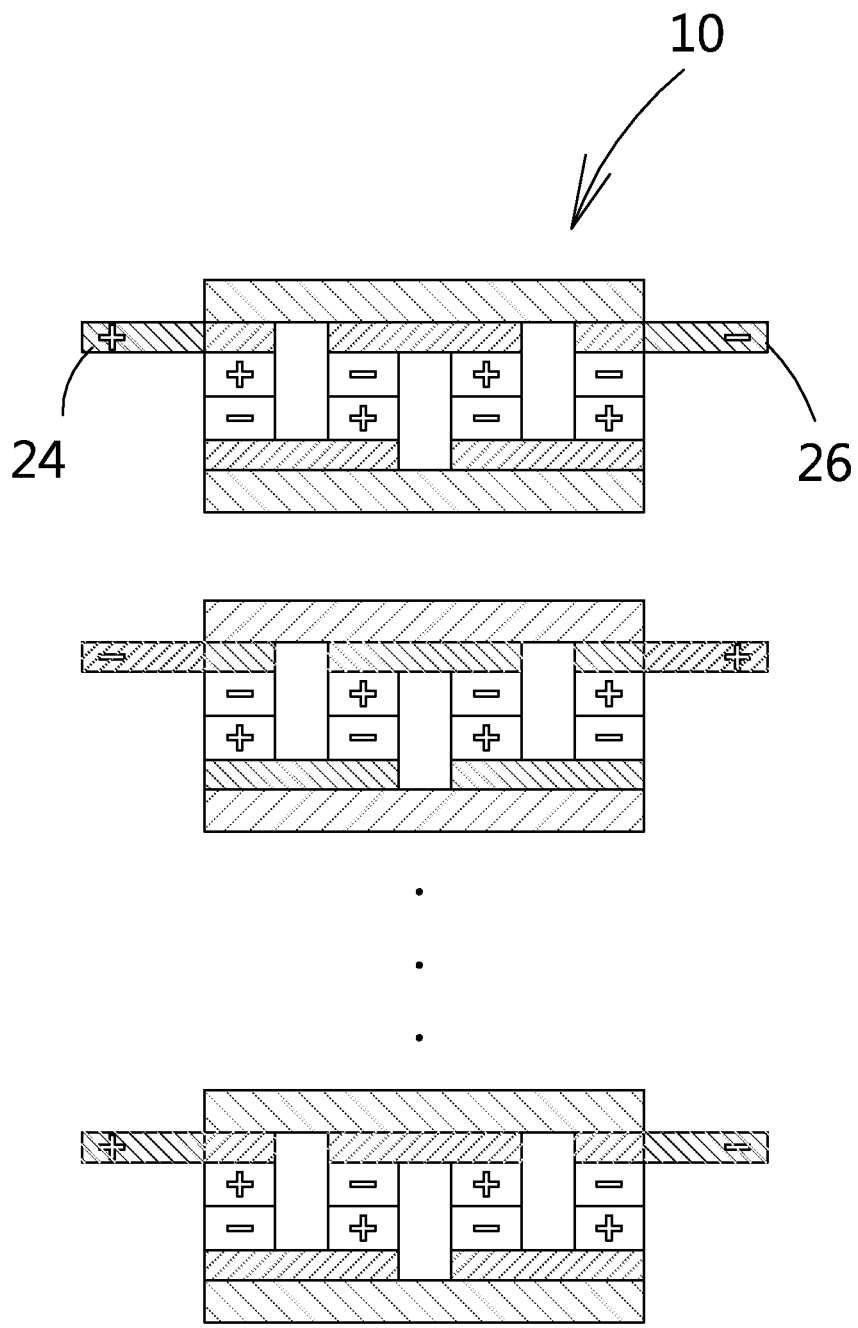
FIG. 8A shows a schematic diagram of externally and serially connecting multiple horizontal composite electricity supply element groups according to an embodiment of the present disclosure.
Figure 8B:
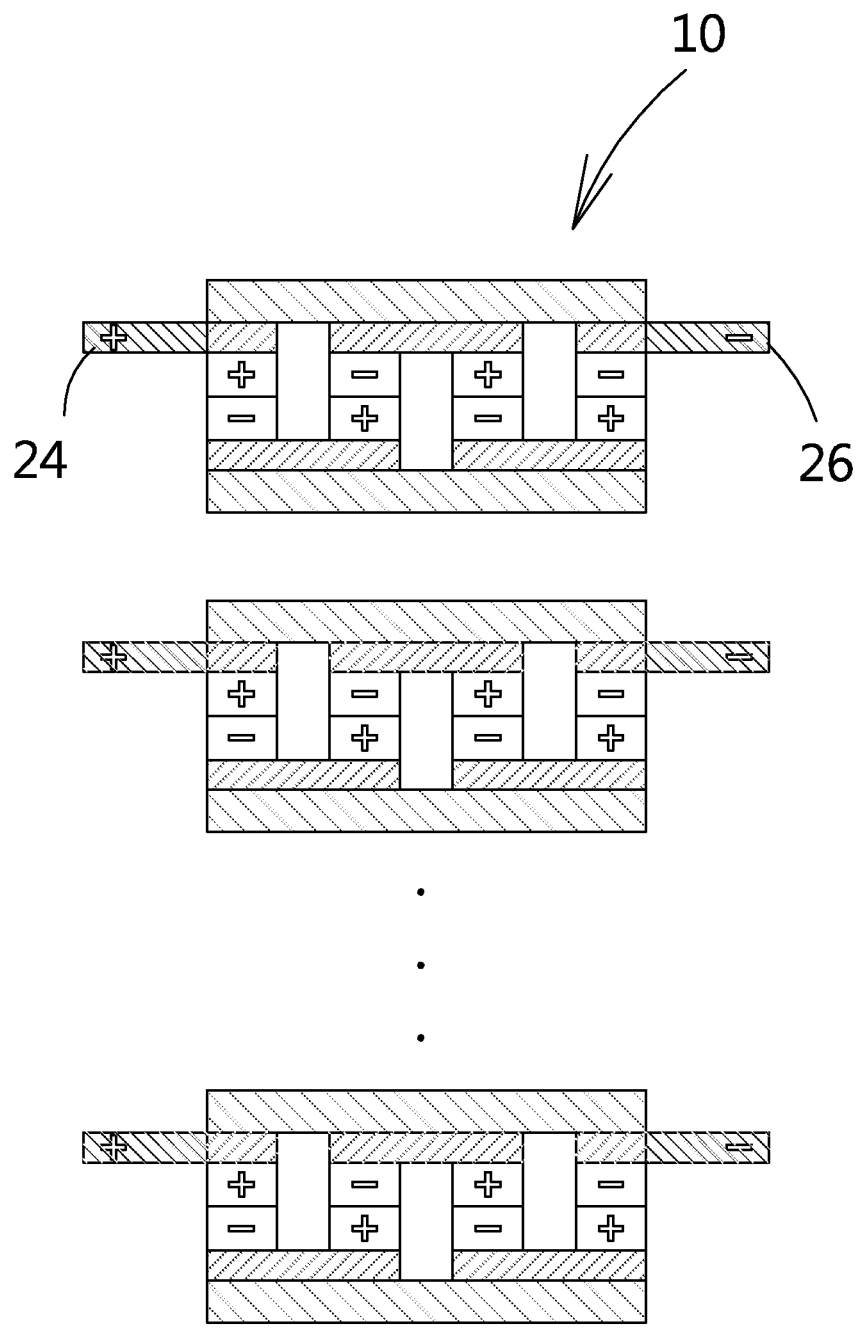
FIG. 8B shows a schematic diagram of multiple horizontal composite electricity supply element groups connected internally and in parallel according to an embodiment of the present disclosure.

Under the architecture of the horizontal composite electricity supply element group according to the present disclosure, to increase the total capacity or total voltage of the battery module, the only thing to do is to perform external series/parallel connection of multiple horizontal composite electricity supply element groups 10 by using the first and second conductive leads 24, 26. Then the total capacity or the total voltage of the battery module can be increased. For example, multiple horizontal composite electricity supply element groups 10 are connected in series, and the total voltage is increased, as shown in FIG. 8A. Multiple horizontal composite electricity supply element groups 10 are connected in parallel, and the total capacity is increased, as shown in FIG. 8B.

Figure 9:
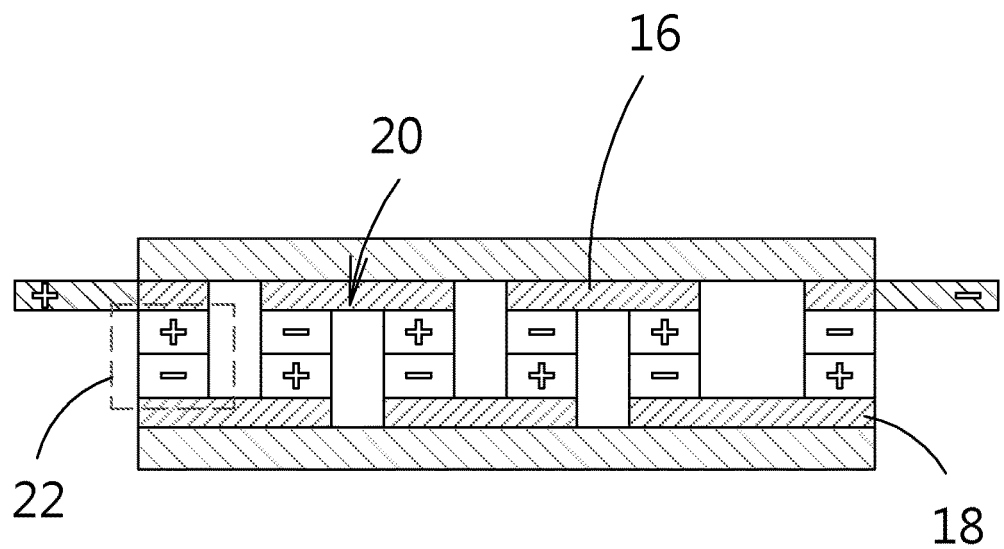
FIG. 9 shows a schematic diagram of the horizontal composite electricity supply element group according to another embodiment of the present disclosure.

The total voltage may be increased by adding the amount of the electricity supply element group 10. For example, as shown in FIG. 9, compared to FIG. 3, two electricity supply element groups 20 are connected in series via the first and second patterned conductive layers 16, 18.

Please refer to FIG. 6. Two electricity supply element groups 20 form a new set 28 by connecting the same polarity via the first and second patterned conductive layers 16, 18. Then multiple sets 28 are connected in series by connecting the opposite polarities via the first and second patterned conductive layer 16, 18. In addition, the electricity supply element group 20 shown in FIG. 6 may also be formed by multiple electricity supply elements 22 connected in series for supplying a larger voltage. Although the new set 28 can be integrated into an element, the relatively large amount of gaps 30 is presented if they are separated.

Figure 10:
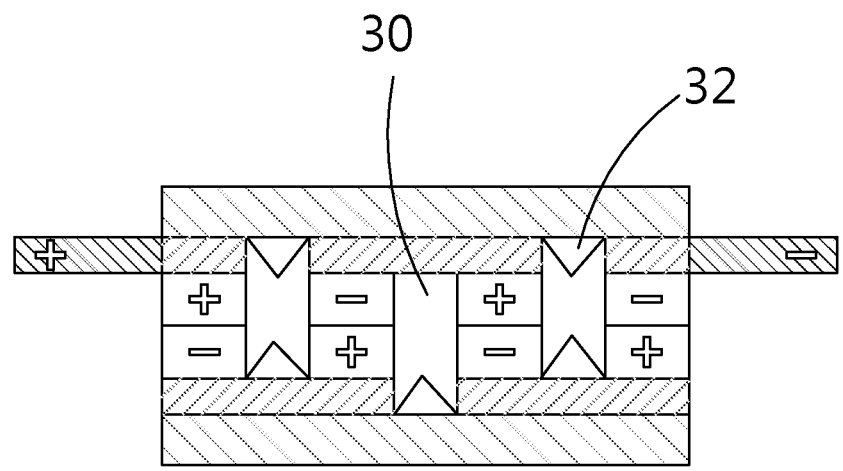
FIG. 10 shows a schematic diagram of the horizontal composite electricity supply element group according to another embodiment of the present disclosure.

Please refer to FIG. 10. The gaps between connected electricity supply element groups 20 can act as the heat dissipation channels for the horizontal composite electricity supply element group 10. Multiple positioning members 32 are formed on the surfaces of the first insulation layer 12 and/or the second insulation layer 14 facing the electricity supply element groups 20. The positioning members 32 are exposed outside the first or second patterned conductive layers 16, 18 for limiting the locations of the electricity supply element groups 20. For example, because the electricity supply element 22 includes the current collecting layer, the existence of the positioning member 32 can assist to fix the electricity supply element group 20 formed by one or more electricity supply elements 22 to the correct location. Furthermore, a fluid, such as gas or liquid, may be presented in the gaps 30 for increasing the heat dissipation effect.

Figure 11:
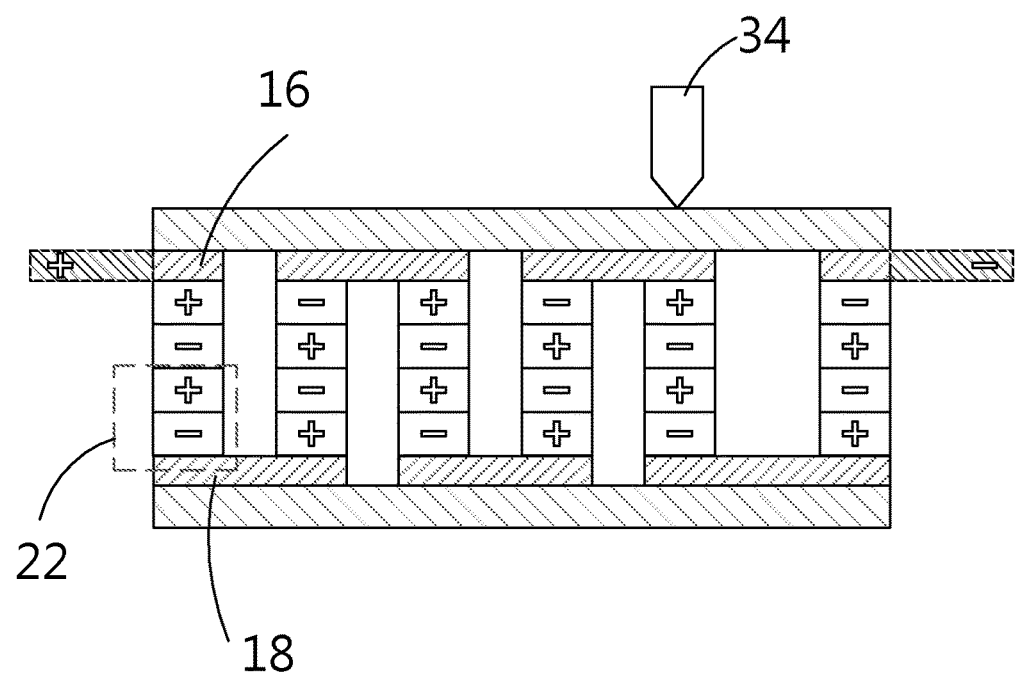
FIG. 11 shows a schematic diagram of the horizontal composite electricity supply element group according to another embodiment of the present disclosure.

The benefits of the present disclosure will be further described. For example, according to the composite electricity supply element group of the Taiwan patent application No. 106136071, twenty-four electricity supply elements are vertically stacked and connected in series to achieve a voltage value of 24*4.2 volts. By adopting the horizontal composite electricity supply element group according to the present disclosure given the same voltage value and number of electricity supply elements, twenty-four single electricity supply elements are connected in opposite polarities in a horizontal direction via the first and second patterned conductive layers 16, 18, resulting in the horizontal extension state shown in FIG. 9. Alternatively, twelve pairs of serially stacked electricity supply elements can be connected in opposite polarities in a horizontal direction via the first and second patterned conductive layers 16, 18, as shown in FIG. 11. Alternatively, another number of stacked electricity supply elements can be adopted. Under this architecture, when a sharp metal object 34 punctures the horizontal composite electricity supply element group from the outside, the punctured object will only influence a few stacks instead of the twenty-four vertically stacked electricity supply elements. Thereby, the danger of puncture on a massive number of stacked electricity supply elements in series can be avoided effectively.

Moreover, in addition to blocking puncture effectively, the first and second insulation layers 12, 14 according to the present disclosure act as the blocking layers for electrical contact between the first and second patterned conductive layers when multiple battery cells 10 are connected.

Next, when the electricity supply element group 20 is formed by two or more electricity supply elements 22, the serial and/or parallel configurations of the plurality of electricity supply elements 22 are described.

Figure 12:
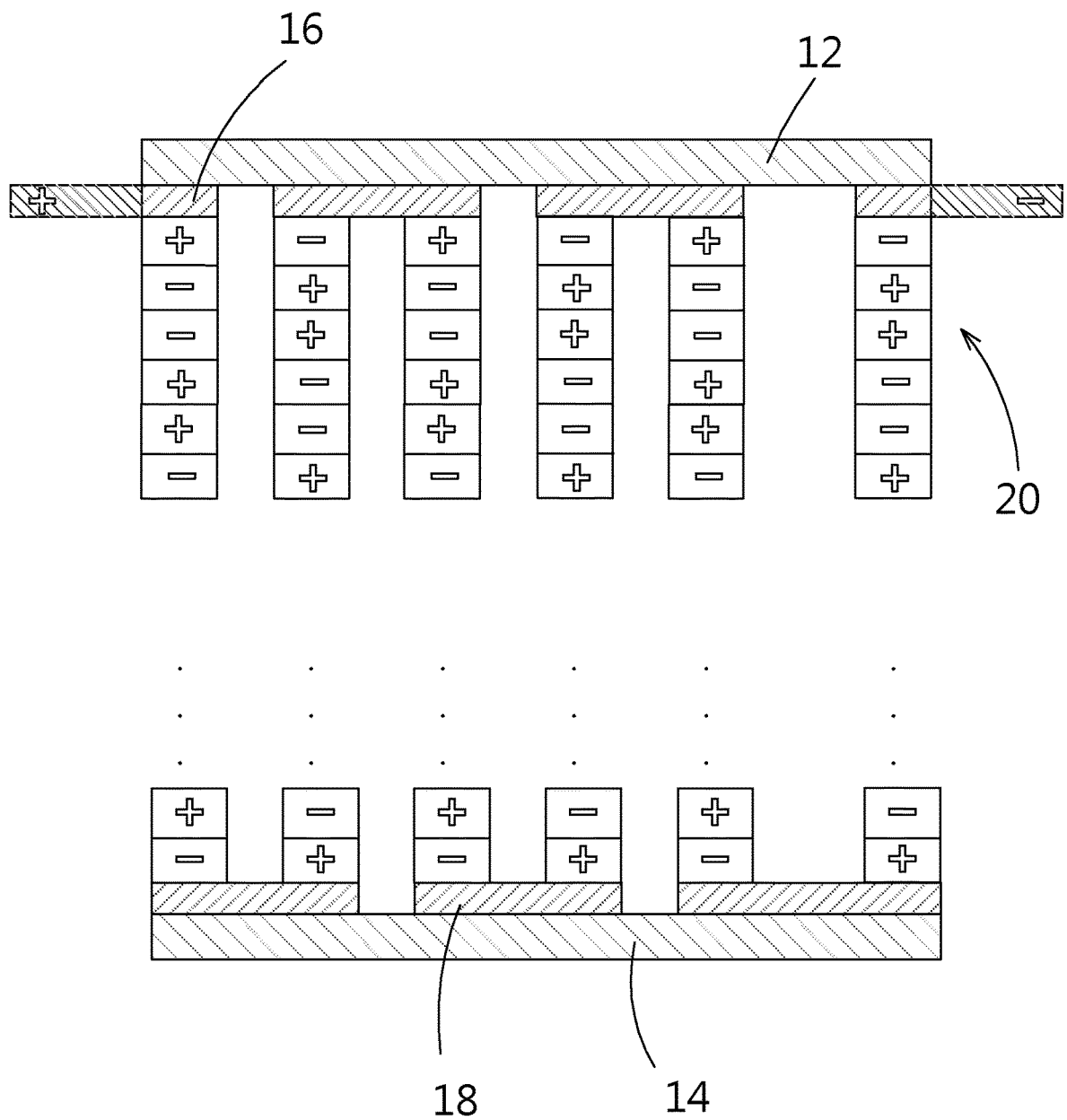
FIG. 12 to FIG. 14 show serial and/or parallel electrical connection diagrams of multiple electricity supply elements in an electricity supply element group according to the present disclosure.
Figure 13:
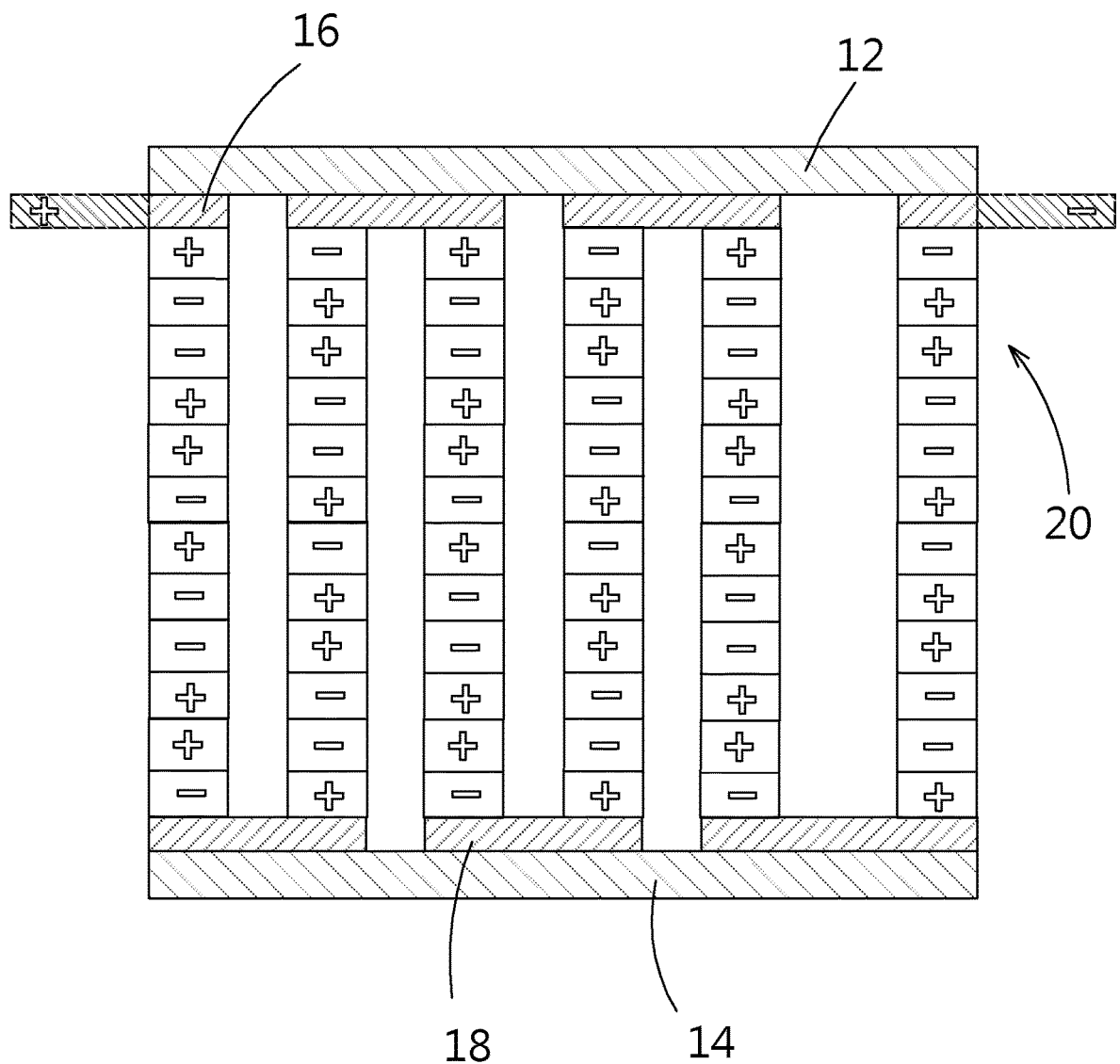
Figure 14:
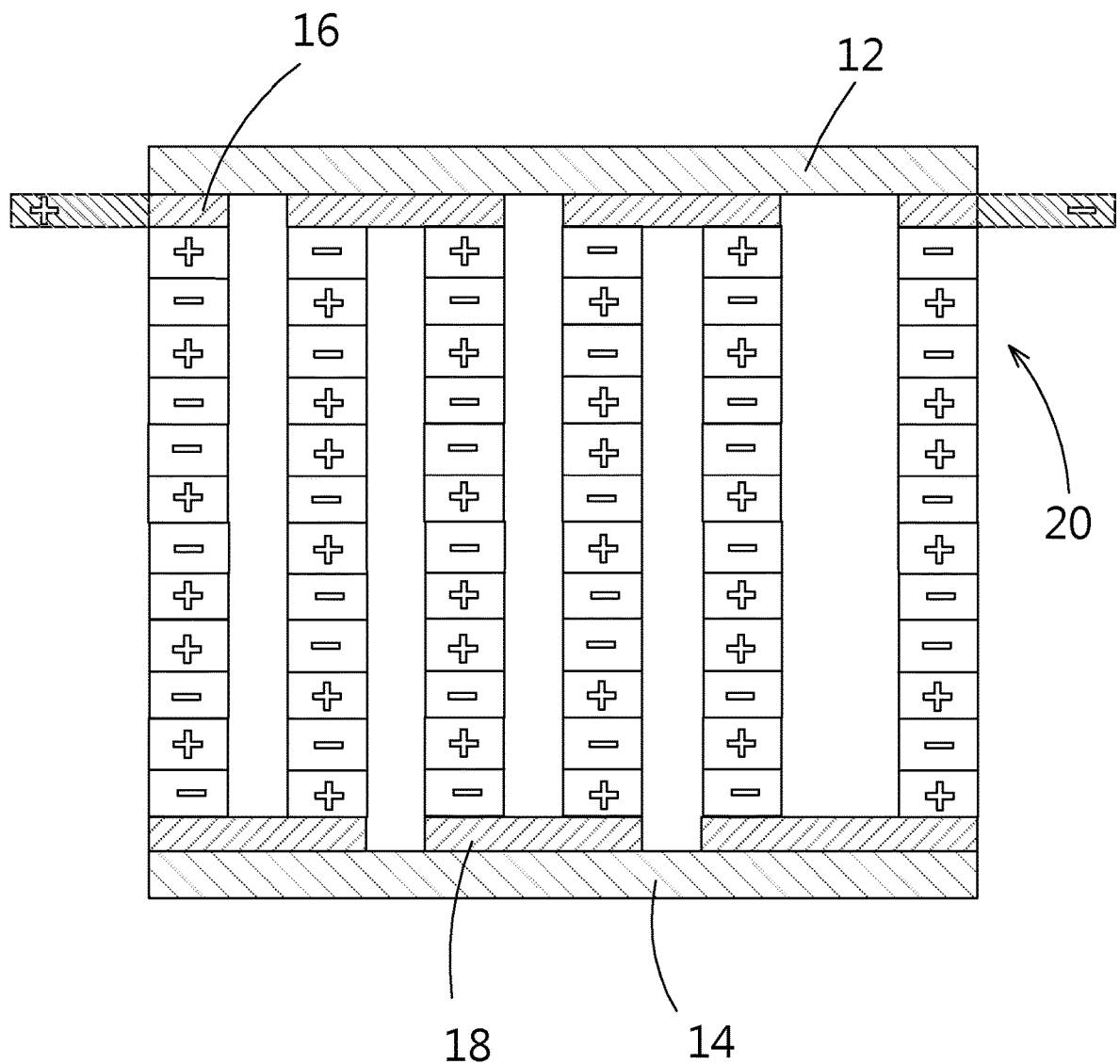
Figure 15:
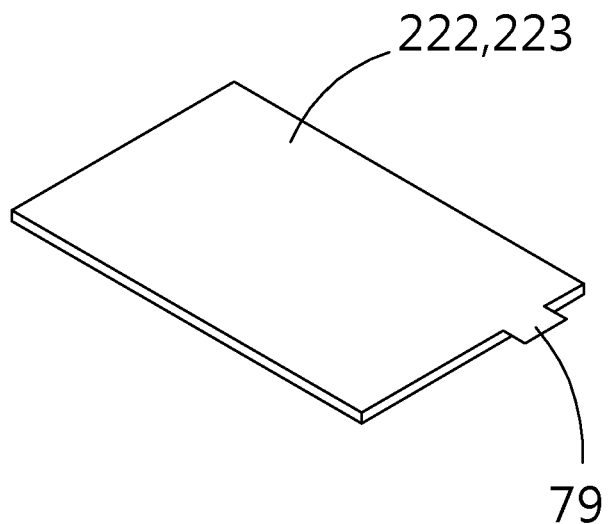
FIG. 15 shows a schematic diagram of a tab formed on the current collecting layer of the electrochemical system element according to the present disclosure.

Please refer to FIG. 5A. In the figure, multiple electricity supply elements 22 in the electricity supply element group 20 are connected electrically in series via opposite polarities. Please refer to FIG. 12: multiple electricity supply elements 22 in the electricity supply element group 20 are connected electrically in parallel via the same polarity. Please refer to FIG. 13: multiple electricity supply elements 22 in the electricity supply element group 20 are connected in a mixed method by first parallel and then series connections. Please refer to FIG. 14: multiple electricity supply elements 22 are connected in series and then connected in parallel in the electricity supply element group 20. In the mixed connection method as described above, the positive/negative terminals (the current collecting layers) of the electricity supply element 22 are connected to the corresponding patterned conductive layers through suitable wires. In addition, for connection of wires and the current collecting layers of the electricity supply elements 22, a tab 79 can be disposed at the current collecting layers, as shown in FIG. 15.

To sum up, the present disclosure discloses a horizontal composite electricity supply element group, which comprises multiple electricity supply element groups arranged side by side. The electricity supply element groups are connected in series and/or in parallel inside and extended horizontally via the first and second patterned conductive layer for reaching a certain voltage and capacity. In addition, multiple horizontal composite electricity supply element groups can also be connected in series and/or in parallel via the first and second conductive leads. Furthermore, the horizontal composite electricity supply element group according to the present disclosure comprises a first and second insulation layer at the top and bottom acting as the blocking layer for electrical contact of the first and second patterned conductive layers between battery cells, as well as effectively preventing potential damages caused by puncture of metal objects.

Accordingly, the present disclosure conforms to the legal requirements owing to its novelty, nonobviousness, and utility. However, the foregoing description is only of illustrative embodiments of the present invention, and does not limit the scope and range of the present claims. Those equivalent changes or modifications made according to the shape, structure, feature, or spirit described in the claims of the present disclosure are included in the appended claims of the present disclosure.

What is claimed is:

1. A horizontal composite electricity supply element group, comprising:
   a first insulation layer;
   a second insulation layer, disposed opposed to said first insulation layer;
   a first patterned conductive layer, disposed on a first surface of said first insulation layer and having an upper surface extending only along the first surface;
   a second patterned conductive layer, disposed on a second surface of said second insulation layer and having a lower surface extending only along the second surface, and opposed to said first patterned conductive layer;
   a plurality of electricity supply element groups, arranged side by side and sandwiched between said first insulation layer and said second insulation layer, connected electrically via said first patterned conductive layer and said second patterned conductive layer to form series and/or parallel connections; and
   a respective heat dissipation channel disposed between respective adjacent electricity supply element groups;
   wherein each of said electricity supply element groups is formed by a plurality of electricity supply elements, and each of said electricity supply elements includes a first current collecting layer and a second current collecting layer;
   wherein said first current collecting layer or said second current collecting layer of two electricity supply elements on outermost sides of said electricity supply element groups directly contact said first patterned conductive layer or said second patterned conductive layer to form electrical connections;
   wherein each of said electricity supply elements further comprises:
   a package layer, disposed between said first current collecting layer and said second current collecting layer for forming a sealed space;
   a first active material layer, disposed in said sealed space and connected electrically to said first current collecting layer;
   a second active material layer, disposed in said sealed space and connected electrically to said second current collecting layer;
   an isolation layer, disposed in said sealed space, and sandwiched between said first active material layer and said second active material layer; and
   an electrolyte system, disposed in said first active material layer and said second active material layer; and
   wherein each respective heat dissipation channel is outside of each package layer of the respective adjacent electricity supply element groups.

2. The horizontal composite electricity supply element group of claim 1, wherein each of said electricity supply elements is an independent and complete module; said electrolyte systems of said electricity supply elements are not circulated with each other; and no chemical reaction occurs between adjacent electricity supply elements except for charge transferring.

3. The horizontal composite electricity supply element group of claim 1, further comprising a first conductive lead and a second conductive lead connected electrically to said first patterned conductive layer and second patterned conductive layer respectively, or to said second patterned conductive layer and said first patterned conductive layer, respectively.

4. The horizontal composite electricity supply element group of claim 3, wherein said first conductive lead and said second conductive lead are formed integrally with said first patterned conductive layer and/or said second patterned conductive layer.

5. The horizontal composite electricity supply element group of claim 1, wherein a plurality of positioning members are formed on surfaces of said first insulation layer and/or said second insulation layer facing said electricity supply elements, and said plurality of positioning members are exposed outside said first patterned conductive layer or said second patterned conductive layer to limit a location of said electricity supply element group.

6. The horizontal composite electricity supply element group of claim 2, wherein said electrolyte systems are selected from the group consisting of gel state, liquid state, pseudo solid state, solid state or combinations thereof.

7. The horizontal composite electricity supply element group of claim 2, wherein within each of said electricity supply element groups, said first current collecting layer or said second current collecting layer of each of said electricity supply elements directly contacts said second current collecting layer or said first current collecting layer of the adjacent electricity supply element to form an electrical connection.

8. The horizontal composite electricity supply element group of claim 7, wherein said plurality of electricity supply elements are formed to be serially connected via said first current collecting layer and said second current collecting layer with different polarities mutually contacting.

9. The horizontal composite electricity supply element group of claim 1, wherein each package layer of said electricity supply element includes a silicone layer and two modified silicone layers on both sides of said silicone layer, wherein the modified silicone layers are modified by adjusting a ratio of addition and condensation silicone for gluing different materials.

10. The horizontal composite electricity supply element group of claim 1, wherein a fluid is present in each respective heat dissipation channel.

11. The horizontal composite electricity supply element group of claim 10, wherein said fluid is gas or liquid.

12. The horizontal composite electricity supply element group of claim 1, wherein within each of said electricity supply element groups, the electricity supply elements are stacked, and connected in both series and parallel connections.

* * * * *